US008018191B2

(12) United States Patent
Nagase

(10) Patent No.: US 8,018,191 B2
(45) Date of Patent: Sep. 13, 2011

(54) ELECTRIC POWER STEERING SYSTEM

(75) Inventor: Shigeki Nagase, Nabari (JP)

(73) Assignee: JTEKT Corporation, Osaka-shi (JP)

( * ) Notice: Subject to any disclaimer, the term of this patent is extended or adjusted under 35 U.S.C. 154(b) by 550 days.

(21) Appl. No.: 12/235,985

(22) Filed: Sep. 23, 2008

(65) Prior Publication Data

US 2009/0078493 A1   Mar. 26, 2009

(30) Foreign Application Priority Data

Sep. 25, 2007   (JP) ................................. 2007-247613

(51) Int. Cl.
*B62D 5/04* (2006.01)
*B62D 6/00* (2006.01)
(52) U.S. Cl. .......................... 318/479; 318/433; 318/504
(58) Field of Classification Search .................. 318/432, 318/433, 478, 479, 489, 504, 700, 700.01; 180/443
See application file for complete search history.

(56) References Cited

U.S. PATENT DOCUMENTS

| 5,039,926 | A   | * | 8/1991  | Morishita et al. | ............. | 318/434 |
| 6,987,371 | B2  | * | 1/2006  | Kifuku           | .......................... | 318/432 |
| 7,106,012 | B2  | * | 9/2006  | Matsuda et al.   | ............... | 318/139 |
| 7,589,940 | B2  | * | 9/2009  | Sawano et al.    | .................. | 361/18  |
| 7,845,459 | B2  | * | 12/2010 | Kasai            | ............................ | 180/443 |

FOREIGN PATENT DOCUMENTS

| EP | 1 655 165 A2 | 5/2006 |
| EP | 1 655 165 A3 | 5/2006 |
| JP | 2005-287222  | 10/2005 |

* cited by examiner

*Primary Examiner* — Bentsu Ro
(74) *Attorney, Agent, or Firm* — Oblon, Spivak, McClelland, Maier & Neustadt, L.L.P.

(57) ABSTRACT

A main power supply and an auxiliary power supply for supplying power to a motor are provided. A MOS-FET for supplying power from the main power supply and a MOS-FET for supplying power from the main and auxiliary power supplies are provided. When a phenomenon in which a rotor of a motor is rotated by the going-back force of steered wheels occurs, and voltage $V_G$ of power generated by the motor satisfies the relation $V_G > V_B + V_C$ where $V_B$ is a voltage of the main power supply and $V_C$ is a voltage of the auxiliary power supply, a control circuit and a gate drive circuit turn off both MOS-FETs so as to charge the auxiliary power supply using the voltage $V_G$ through a parasitic diode of the MOS-FET.

3 Claims, 2 Drawing Sheets

ELECTRIC POWER STEERING SYSTEM

BACKGROUND OF THE INVENTION

This invention relates to an electric power steering system for generating steering assist force by a motor and in particular to a configuration of an electric circuit of the electric power steering system.

The electric power steering system is an apparatus for generating steering assist force by a motor in response to steering torque occurring in a steering shaft. In recent years, demand for an electric power steering system for a large-size vehicle has grown sharply. When implementing it in the large-size vehicle, the required steering assist force is increased. Therefore, larger electric power must be supplied to the motor. However, to use only a main power supply implemented as a battery, such large electric power may be unable to be sufficiently provided. Then, a configuration is proposed in which an auxiliary power supply of a secondary battery is provided aside from the main power supply and usually only the main power supply is used and when larger electric power is required, the main power supply and the auxiliary power supply are connected in series for supplying electric power (For example, refer to Japanese Patent Laid-Open No. 2005-287222). The auxiliary power supply is charged using the battery when only the main power supply is used.

In the configuration as described above, the auxiliary power supply discharged as it is used needs quick recharging. Since the auxiliary power supply is charged using the battery, if it is charged frequently, the frequent charging becomes a burden on the battery. However, any other method than the method for charging the auxiliary power supply is not yet proposed.

SUMMARY OF THE INVENTION

It is therefore an object of the invention to provide an electric power steering system excellent in the charging capability of an auxiliary power supply.

According to the invention, there is provided an electric power steering system for generating steering assist force by driving a motor using a main power supply and an auxiliary power supply for auxiliary power as required, the electric power steering system comprising:

a first switch including a first switching element provided in a path for supplying power from the main power supply to the motor and a first diode existing in parallel with the first switching element for making a current flow direction forward at a power supplying time;

a second switch including a second switching element provided in a path for supplying power from the main power supply and the auxiliary power supply to the motor and a second diode existing in parallel with the second switching element and in an opposite direction to the current flow direction at the power supplying time;

a voltage detector which detects a sum voltage ($V_B+V_C$) based on a voltage $V_B$ of the main power supply and a voltage $V_C$ of the auxiliary power supply;

a rotation speed detector which detects the rotation speed of the motor; and a control and drive unit which computes a voltage $V_G$ of power generated by the motor based on the rotation speed detected by the rotation speed detector, compares the voltage $V_G$ with the voltage detected by the voltage detector, and if the relation $V_G>V_B+V_C$ holds, turns off both the first switching element and the second switching element to stop the power supply from the main power supply and the auxiliary power supply to the motor for charging the auxiliary power supply using the voltage $V_G$ through the second diode.

In the electric power steering system as described above, a phenomenon in which the rotor of the motor is rotated at high speed occurs as the steered wheels driven by the electric power steering system receives a reaction force from a road. If the voltage $V_G$ of power generated by the motor satisfies the above-mentioned relation, the auxiliary power supply is charged using the voltage $V_G$ through the second diode. That is, it is made possible to charge the auxiliary power supply independently of the main power supply.

In the electric power steering system described above, the rotation speed detector may differentiate output of an angle sensor for detecting the angle position of the rotor in the motor with respect to the time to find the rotation speed.

Although the angle sensor is essentially used for the motor drive control, the most of the angle sensor is made to find the rotation speed, so that the configuration to charge the auxiliary power supply using the voltage $V_G$ can be simplified.

In the electric power steering system described above, the first switch and the second switch may include MOS-FETs and the first diode and the second diode may be parasitic diodes of the respective MOS-FETs.

In this case, the most of the parasitic diode of the MOS-FET can be made, so that an additional diode need not be provided and therefore the configuration to charge the auxiliary power supply using the voltage $V_G$ can be simplified.

According to the electric power steering system of the invention, the auxiliary power supply can be charged through the second diode using the voltage $V_G$ of power generated by the motor, so that it is made possible to charge the auxiliary power supply independently of the main power supply. Therefore, the electric power steering system excellent in the charging capability of the auxiliary power supply can be provided.

DETAILED DESCRIPTION OF PREFERRED EMBODIMENTS

Figure 1:
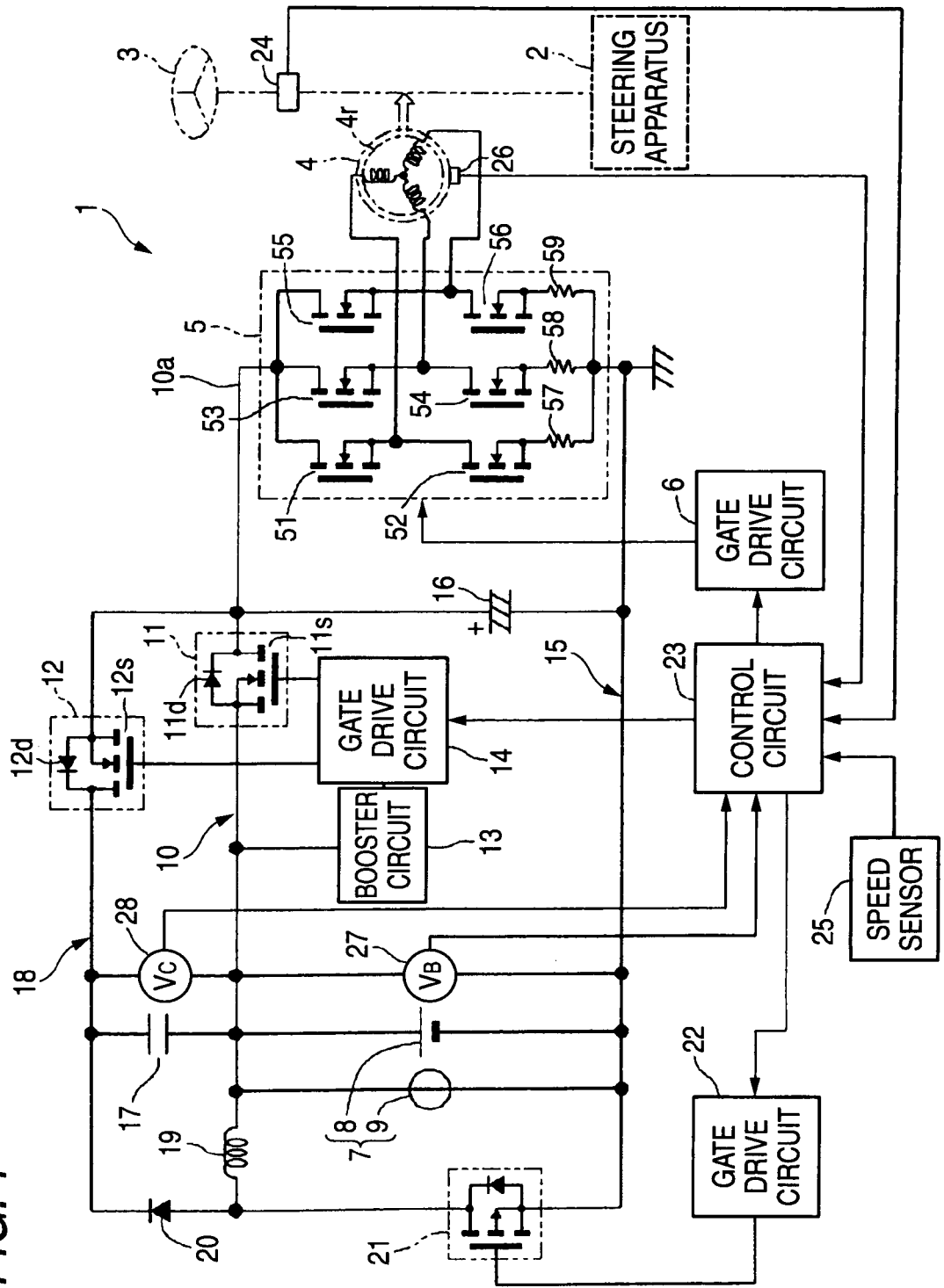
FIG. 1 is a circuit diagram of an electric power steering system according to one embodiment of the invention.

FIG. 1 is a circuit diagram to show the configuration of an electric power steering system 1 according to one embodiment of the invention, and mainly show an electric circuit thereof. In the figure, a steering apparatus 2 is driven by a driver's steering torque given to a steering wheel 3 and a steering assist force generated by a motor 4. A speed reducer (not shown) is used for power transmission from a rotor 4r of the motor 4 to the steering apparatus 2. The motor 4 is a three-phase brushless motor and is driven by a motor drive circuit 5. The motor drive circuit 5 has MOS-FETs 51 to 56 making up a three-phase bridge circuit and resistors 57 to 59, which are connected as shown in the figure. The MOS-FETs 51 to 56 are switched by a gate drive circuit (FET driver) 6.

A main power supply 7 for supplying power to the motor drive circuit 5 is made up of a battery 8 and an alternator (having rectification and regulator functions) 9. A MOS-FET 11 as a "first switch" is provided at a midpoint in a non-ground path 10 for introducing a voltage of the main power supply 7 into the motor drive circuit 5. The MOS-FET 11 is made up of a switching element 11s of the essential function of the MOS-FET and a parasitic diode 11d existing in parallel with the switching element 11s. The MOS-FET 11 is an n-channel transistor having a source on the main power supply 7 side and a drain on the motor drive circuit 5 side. The parasitic diode 11d is configured so that the current flowing direction becomes forward when electric power is supplied from the main power supply 7 to the motor 4.

A booster circuit 13 (bootstrap circuit) for performing gate drive of the MOS-FET 11 is connected to the path 10 to which the voltage of the main power supply 7 is given, and a gate voltage is given through a gate drive circuit 14 based on the output voltage of the booster circuit 13. An electrolytic capacitor 16 for smoothing is provided between the drain of the MOS-FET 11 and a ground path 15.

On the other hand, an auxiliary power supply 17 is made up of an electric double layer capacitor or a lithium-ion battery and is connected in series to the main power supply 7. A feeding path (high-potential path) 18 of the auxiliary power supply 17 is connected to the drain of the MOS-FET 11 and the motor drive circuit 5 through a MOS-FET 12 as a "second switch." The MOS-FET 12 is made up of a switching element 12s of the essential function of the MOS-FET and a parasitic diode 12d existing in parallel with the switching element 12s. The MOS-FET 12 is an n-channel transistor having a source on the motor drive circuit 5 side and a drain on the auxiliary power supply 17 side. The parasitic diode 12d is in an opposite direction to the current flowing direction when electric power is supplied from the main power supply 7 and the auxiliary power supply 17 to the motor 4.

An anode of a diode 20 is connected to the low-potential side of the auxiliary power supply 17 through a reactor 19. A cathode of the diode 20 is connected to the feeding path 18 of the auxiliary power supply 17. A p-channel MOS-FET 21 is provided between the anode of the diode 20 and the ground path 15. A gate of the MOS-FET 21 is driven by a gate drive circuit 22.

The motor drive circuit 5 and the gate drive circuits 6, 14, and 22 operate upon reception of a command signal from a control circuit 23 containing a microcomputer. An output signal from a torque sensor 24 for detecting a steering torque given to the steering wheel 3 is input to the control circuit 23. An output signal of a speed sensor 25 for detecting vehicle speed is input to the control circuit 23. Further, the motor 4 is provided with an angle sensor 26 for detecting the rotation angle position of the rotor 4r, and an output signal of the angle sensor 26 is input to the control circuit 23.

On the other hand, a voltage detector 27 is connected in parallel with the main power supply 7 and a voltage detector 28 is connected in parallel with the auxiliary power supply 17. The voltage detector 27 connected in parallel with the main power supply 7 detects a voltage (interterminal voltage) $V_B$ of the main power supply 7 and outputs a signal to the control circuit 23. The voltage detector 28 connected in parallel with the auxiliary power supply 17 detects a voltage (interterminal voltage) $V_C$ of the auxiliary power supply 17 and outputs a signal to the control circuit 23. The control circuit 23 detects the voltage ($V_B+V_C$) based on the output signals of the two voltage detectors 27 and 28. That is, the voltage detectors 27 and 28 and the control circuit 23 make up "voltage detector" for detecting the sum voltage ($V_B+V_C$) based on the voltage $V_B$ of the main power supply 7 and the voltage $V_C$ of the auxiliary power supply 17.

The control circuit 23 operates the motor drive circuit 5 for driving the motor 4 through the gate drive circuit 6 to generate an appropriate steering assist force based on the steering torque signal sent from the torque sensor 24, the vehicle speed signal sent from the speed sensor 25, and the rotation angle position signal sent from the angle sensor 26.

The angle sensor 26 and the control circuit 23 make up "rotation speed detector" for detecting the rotation speed of the motor 4.

When the MOS-FET 21 is on, a current flows from the main power supply 7 through the reactor 19 and the MOS-FET 21. When the MOS-FET 21 is turned off, a reverse high voltage is generated in the reactor 19 so as to hinder magnetic flux change caused by current shutoff, whereby the auxiliary power supply 17 is charged through the diode 20 with the voltage provided by boosting the output of the main power supply 7. Therefore, the auxiliary power supply 17 can be charged by repeating turning on and off the MOS-FET 21.

The control circuit 23 estimates required power for providing a necessary steering assist force based on the steering torque and the vehicle speed and compares the estimated power with a reference value. When the required power is equal to or less than the reference value, the control circuit 23 turns on the MOS-FET 11 and turns off the MOS-FET 12. Therefore, the voltage of the main power supply 7 is smoothed with the smoothing capacitor 16 and then is supplied to the motor drive circuit 5, which then drives the motor 4 based on a control signal of the control circuit 23. In this case, power of the auxiliary power supply 17 is not supplied to the motor drive circuit 5. Since the resistance of the switching element 11s in the n-channel MOS-FET 11 is exceptionally small (for example, about 1 mΩ) as compared with the forward resistance of the parasitic diode 11d, most of the current flowing from the main power supply 7 into the motor drive circuit 5 flows into the switching element 11s.

The control circuit 23 monitors the voltage $V_C$ of the auxiliary power supply 17. If the voltage does not reach a given voltage, the control circuit 23 turns on and off the MOS-FET 21 through the gate drive circuit 22 to charge the auxiliary power supply 17. In this case, the auxiliary power supply 17 is charged, for example, when the torque sensor 24 does not detect a steering torque.

On the other hand, when the required power exceeds the reference value, namely, when only the main power supply 7 would be unable to provide the required power, the control circuit 23 turns off the MOS-FET 11 and turns on the MOS-FET 12. Consequently, the voltage is supplied to the motor drive circuit 5 in a state in which the main power supply 7 and the auxiliary power supply 17 are connected in series. Accordingly, large power exceeding the power that can be output from the main power supply 7 can be supplied to the motor drive circuit 5. At this time, the cathode of the parasitic diode 11d of the MOS-FET 11 is in a higher potential than the anode, namely, a reverse voltage, so that wraparound of the current from the auxiliary power supply 17 to the main power supply 7 is blocked.

Thus, power supply switching control (containing charging) for selecting either (1) only the main power supply or (2) main power supply+auxiliary power supply is performed in response to the required power.

The MOS-FETs 11 and 12 are n-channel transistors as described above. As n-channel MOS-FETs, there is a wide selection of products with small on resistance, and the n-channel MOS-FETs are suited for the use as mentioned above. Moreover, generally the n-channel MOS-FETs involve rich product types and are easy to select and are inexpensive. Although P-channel MOS-FETs can also be used, there is a narrower selection of products with small on resistance than the n-channel MOS-FETs and the chip size of the P-channel MOS-FET is also larger than that of the n-channel MOS-FET and thus the n-channel MOS-FETs are preferred to the p-channel MOS-FETs from a practical standpoint.

Figure 2:
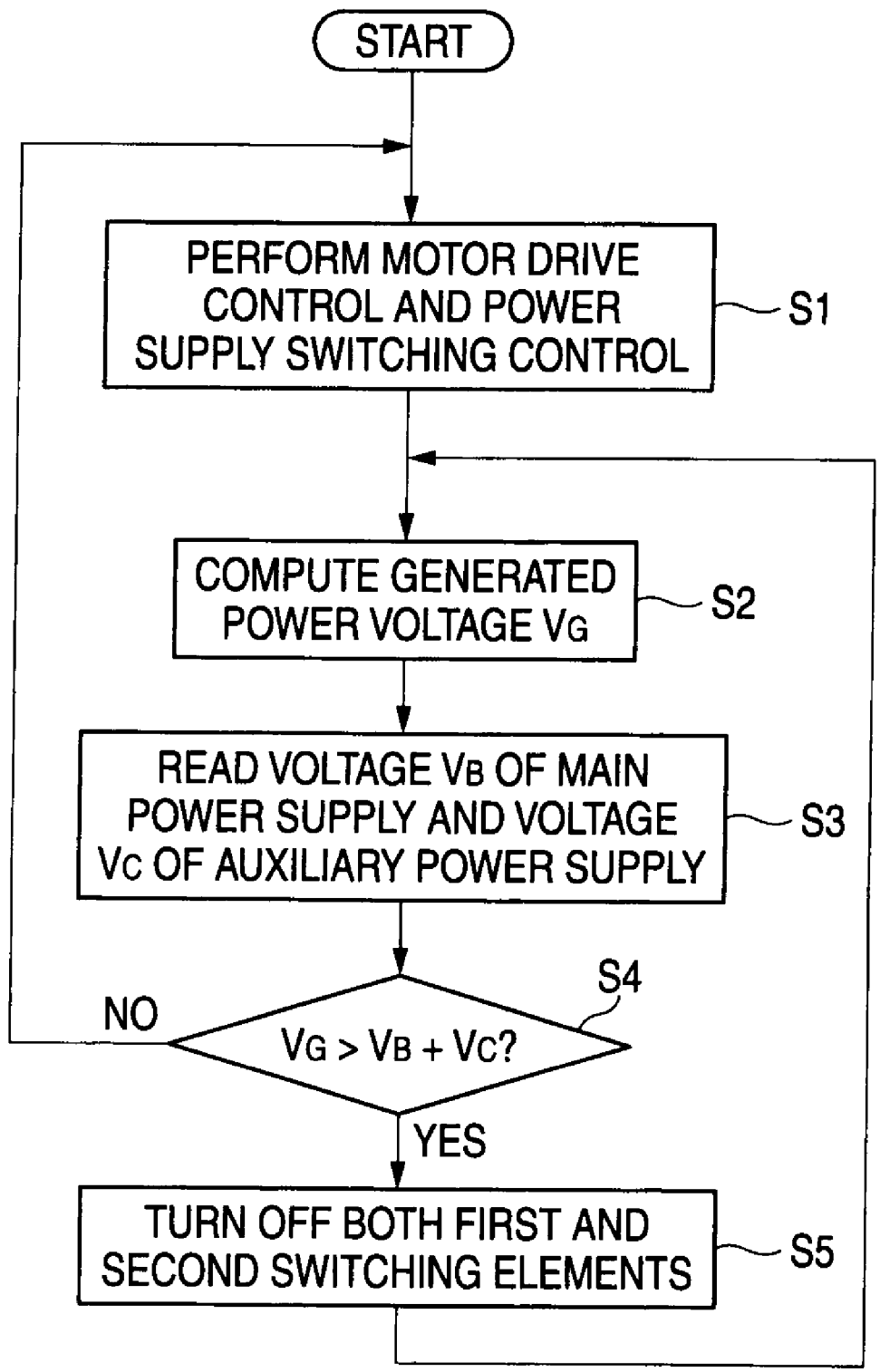
FIG. 2 is a flowchart to show processing executed by a control circuit in the electric power steering system in FIG. 1.

On the other hand, "control and drive unit" made up of the control circuit 23 and the gate drive circuit 14 has a function of making it possible to charge the auxiliary power supply 17 using generated power voltage described below in addition to the power supply switching control described above:

FIG. 2 is a flowchart to show the operation concerning charging the auxiliary power supply 17 using generated power voltage. First, at step S1, the control circuit 23 performs the motor drive control and the power supply switching control described above. Subsequently, the control circuit 23 differentiates the angle position signal input from the angle sensor 26 with respect to the time to find rotation speed ω [rad/sec] of the motor 4 (rotor 4r) and multiplies the rotation speed ω by a counter electromotive force constant Ke provided by performing previous actual measurement to compute generated power voltage $V_G$ (step S2). That is, $V_G = Ke \cdot \omega$.

Next, the control circuit 23 reads the voltage $V_B$ of the main power supply 7 and the voltage $V_C$ of the auxiliary power supply 17 based on the output signals of the voltage detectors 27 and 28 (step S3). The control circuit 23 determines whether or not the relation $$V_G > V_B + V_C$$

holds between the generated power voltage $V_G$ and the voltage ($V_B + V_C$) (step S4). Usually, the generated power voltage $V_G$ is equal to or less than the voltage ($V_B + V_C$) in a state in which steered wheels (not shown) are operated actively based on steering of the driver. Therefore, steps S1 to S4 are repeated until a determination of "YES" is made at step S4 after returning from step S4 to S1.

On the other hand, for example, if the driver releases the steering wheel 3 just after cornering, the steered wheels quickly go back to the former state by themselves. Thus, a phenomenon in which the rotor 4r of the motor 4 is rotated by the going-back force of the steered wheels occurs. Moreover, the rotor 4r is connected to the steering apparatus 2 through the speed reducer (not shown) and thus if power is transmitted in the opposite direction, the rotor 4r is rotated at high speed. At this time, the generated power voltage $V_G$ satisfying the relation in expression (1) is generated in the non-ground path 10a of the motor drive circuit 5.

Therefore, the control circuit 23 goes to step S5 and turns off both the first switching element 11s of the MOS-FET 11 and the second switching element 12s of the MOS-FET 12 (maintains the switching elements off if they are already off). Then, steps S2 to S5 are repeated and both the first switching element 11s and the second switching element 12s are turned off until the relation in expression (1) does not hold.

In this state, the generated power voltage $V_G$ is given to the auxiliary power supply 17 through the parasitic diode 12d of the MOS-FET 12, thereby charging the auxiliary power supply 17. This charging is performed continuously while the generated power voltage $V_G$ satisfies the relation in expression (1). Therefore, the auxiliary power supply 17 can be charged independently of the main power supply 7.

Then, when the generated power voltage $V_G$ lowers and does not satisfy expression (1), the determination at step S4 becomes "NO" and the switching elements 11s and 12s are turned on or off by the essential power supply switching control (step S1).

Since the power voltage $V_G$ satisfying expression (1) is generated only for the time until the steered wheels go back to the straight-ahead direction, the once chargeable power is limited. However, the generated power voltage $V_G$ satisfying expression (1) occurs a large number of times while the vehicle is running. Therefore, although the once chargeable power is limited, it is made possible to charge the auxiliary power supply 17 with large power by charging a large number of times. In addition, charging using the reactor 19, the diode 20, and the MOS-FET 21 is also performed by the control circuit 23, so that the charging capability can be dramatically improved as a whole.

Thus, the electric power steering system excellent in the charging capability of the auxiliary power supply can be provided.

Although the angle sensor 26 is fundamentally used for the motor drive control, by using the angle sensor 26 for finding the rotation speed, the configuration to charge the auxiliary power supply 17 using the voltage $V_G$ can be simplified.

To charge the auxiliary power supply 17, the parasitic diode 12d of the MOS-FET 12 can be used, so that an additional diode need not be provided and therefore the configuration for charging the auxiliary power supply 17 using the voltage $V_G$ can be simplified. The parasitic diode 11d of the MOS-FET 11 can be used in the same manner, so that an additional diode need not be provided.

However, as for the MOS-FET 12, for example, to decrease the forward resistance at the charging time using the voltage $V_G$ and to increase the response speed, a diode may be provided aside from the parasitic diode 12d.

In the embodiment described above, the MOS-FETs 11 and 12 are used as the switches provided in the path 10 of the main power supply 7 and the feeding path 18 of the auxiliary power supply 17, but any other switching element (for example, BJT or IGBT) than the MOS-FET can also be used if it has low on resistance. In any case, however, a diode connected in parallel with the switching element in the direction shown in FIG. 1 is required.

What is claimed is:

1. An electric power steering system for generating steering assist force by driving a motor using a main power supply and an auxiliary power supply for auxiliary power as required, the electric power steering system comprising:
    a first switch including a first switching element provided in a path for supplying power from the main power supply to the motor and a first diode arranged in parallel with the first switching element such that a current flow direction of the first diode coincides with a current flow direction at a power supplying time;
    a second switch including a second switching element provided in a path for supplying power from the main power supply and the auxiliary power supply to the motor and a second diode arranged in parallel with the second switching element such that a current flow direction of the second diode is opposed to the current flow direction at the power supplying time;
    a voltage detector which detects a sum voltage ($V_B+V_C$) based on a voltage $V_B$ of the main power supply and a voltage $V_C$ of the auxiliary power supply;
    a rotation speed detector which detects the rotation speed of the motor; and
    a control and drive unit which computes a voltage $V_G$ of power generated by the motor based on the rotation speed detected by the rotation speed detector, compares the voltage $V_G$ with the voltage detected by the voltage detector, and if the relation $V_G > V_B + V_C$ holds, turns off both the first switching element and the second switching element to stop the power supply from the main power supply and the auxiliary power supply to the motor for charging the auxiliary power supply using the voltage $V_G$ through the second diode.

2. The electric power steering system according to claim 1, wherein the rotation speed detector differentiates output of an angle sensor for detecting an angle position of a rotor in the motor with respect to the time to find the rotation speed.

3. The electric power steering system according to claim 1, wherein the first and second switches include MOS-FETs and the first diode and the second diode are parasitic diodes of the respective MOS-FETs.

* * * * *